March 11, 1941.      E. FITZNER      2,234,592
SELF-LOCKING DIFFERENTIAL MECHANISM Filed Nov. 16, 1939

INVENTOR
Ernst Fitzner
BY
ATTORNEYS

Patented Mar. 11, 1941

2,234,592

UNITED STATES PATENT OFFICE 2,234,592

SELF-LOCKING DIFFERENTIAL MECHANISM

Ernst Fitzner, Stuttgart-Wangen, Germany, assignor to Dr. Ing. h. c. F. Porsche K.-G., Stuttgart-Zuffenhausen, Germany, a company of Germany Application November 16, 1939, Serial No. 304,665
In Germany November 17, 1938

12 Claims. (Cl. 74—315)

This invention relates to improvements in self-locking differential mechanism particularly for power vehicles.

As well known, a differential mechanism permits the application of torque to two driven members in a manner which permits relative motion of said driven members, so that the driven wheels of a vehicle may adapt their motion to the path of the vehicle.

The function of a differential gear of conventional structure can be briefly summed up by stating that it applies equal torque to its two driven members, that is to say for instance, to the two wheels of a rear axle. When one of these wheels slips and fails to find hold on the ground, it cannot transmit any substantial amount of torque, and in consequence little or no torque, can be transmitted to the other wheel.

One object of the present invention is to remedy this said condition with very simple means, which are inexpensive as well as durable.

Another object is to provide improved devices of this type in which a friction coupling is provided, which coupling is actuated by springs, means being provided whereby the reaction of said springs is overcome by the occurrence of relative movement between certain parts of said transmission mechanism.

It is another object of the invention to provide a differential mechanism including equalizing gears in which said equalizing gears are carried by a supporting member having limited motion relative to the differential ring gear and housing, which relative movement is used to determine the effectiveness of the differential locking mechanism.

Further objects and advantages of this invention will be apparent from consideration of the specification as illustrated by the accompanying drawings of a possible embodiment of the invention, in which drawing.

Figure 1:
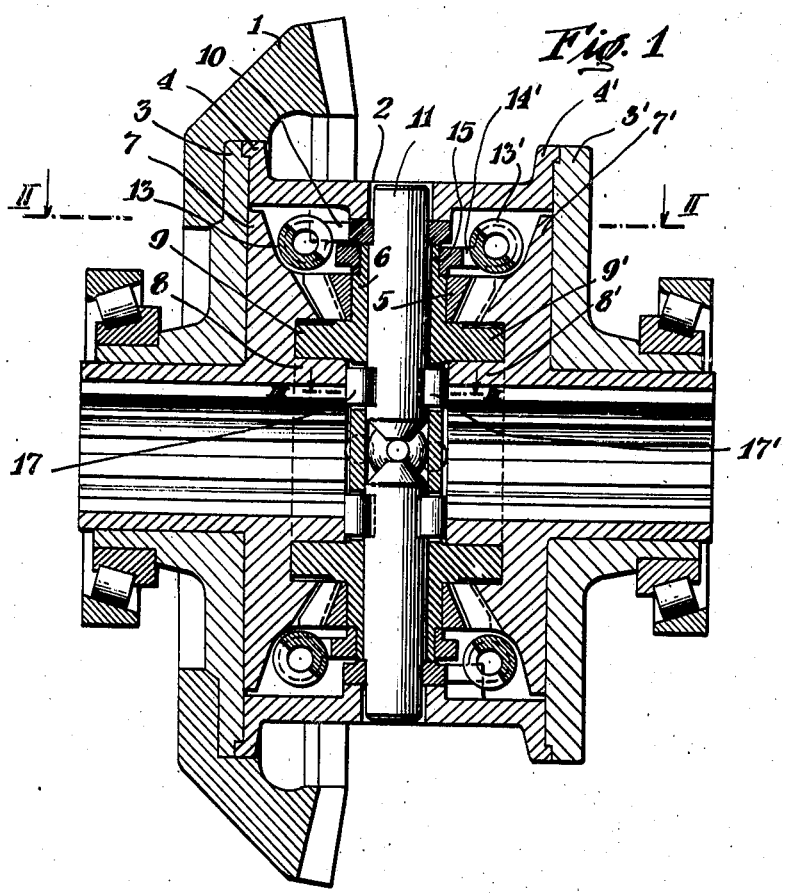
Fig. 1 shows a vertical cross-sectional view of such a transmission.

Referring to said drawing, the numeral 1 indicates a ring gear or other means for applying torque to the differential housing 2 which, in the form shown, consists of a cylindrical portion 4, 4' and two end disks 3, 3', the parts 1 to 4 being mounted on suitable bearings such as the roller bearings shown. 5 indicates equalizing gears of known type such as bevel gears. Instead of having said equalizing gears mounted for rotation on journals which are fixed against rotation relative to the differential housing, said gears 5 in the form illustrated are mounted upon sleeve extensions forming part of a supporting spider 6 including a hub comprising flange extensions 9, 9' which are mounted for rotation upon flange extensions 8, 8' forming part of the side bevel gears 7, 7' which mesh with the equalizing gears 5 and are connected by any known or other suitable means to the road wheel driving shafts (not shown). Also carried by said supporting spider 6 are a plurality of camming shafts 11, the outer ends of which extend through elongated openings in the cylindrical parts 4, 4' of the differential housing so as to provide for limited relative rotative motion as between said shafts, the spider 6 and the equalizing gears 5 on the one hand, and the differential housing 2 on the other hand.

Carried upon each of said shafts 11 for rotation therewith is a suitable member, such as the lever 10, 10' normally bearing at one end against an abutment 12 and/or at its other end against an abutment 12', each of which is carried by the cylindrical portion 4, 4' of the differential housing 2. Said levers 10, 10' also serve as abutments for the springs 13, 13' the other ends of which springs abut against the lever 14, 14', which lever is firmly mounted as at 15 upon the spider 6.

The inner ends of the shafts 11 are formed with cut-away cam portions 16, 16' coacting with which are respectively rollers 17, 17', the outer sides of which bear respectively upon the side gears 7, 7'. It will be seen that upon the occurrence of rotation of shaft 11 in the direction of the arrow R from normal, the cam portion 16, 16' will cause the rollers 17, 17' to be pressed outwardly, thus pressing the outer faces of the side bevel gears 7, 7' against the inner faces of the disks 3, 3' of the differential housing.

Figure 2:
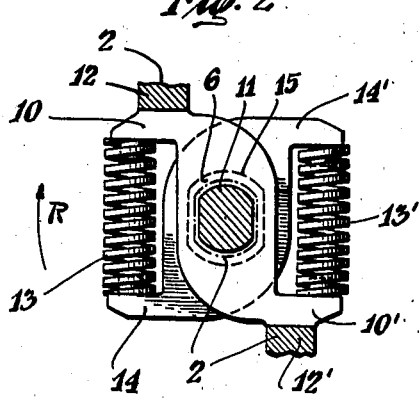
Fig. 2 shows a partial cross-sectional view along the line II—II of Fig. 1, looking in the direction of the arrows.
Figure 3:
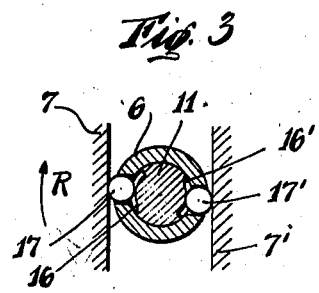
Fig. 3 shows a partial vertical cross-sectional view along the line III—III of Fig. 1, looking in the direction of the arrows.

The operation of the differential mechanism is as follows:

When no torque is being transmitted from the ring gear 1 to the equalizing pinion carrying spider 6, the parts will be in the position shown in Figs. 2 and 3, in which the springs 13, 13' have moved the lever 10, 10' clockwise, in the direction of the arrow R. In this position of the parts, the camming shaft 11 will, through cam portions 16, 16', have pressed the rollers 17, 17' outwardly to cause the side bevel pinions 7, 7' to be pressed against the differential housing and to cause the differential mechanism to be coupled. The parts will remain in this position until torque in excess of an amount determined by the strength of springs 13, 13' has been applied. When this occurs, the lever 10, 10' will either on account of pressure thereagainst in one direction by abutment 12 or thereagainst in the other direction by abutment 12', cause the lever 10, 10' to be rocked counter clockwise (Fig. 2), thus rotating cam shaft 11 and thereby relieving the spreading pressure on gears 7, 7' and thus freeing the differential mechanism for complete freedom of differential action.

Under these conditions curves may be negotiated with full freedom. However, if one of the driven road wheels should be resting in sand, mud, or upon an icy surface, so that no appreciable torque could ordinarily be applied thereto, as a result of which no appreciable torque could be applied as between the differential housing and the pinion carrying spider 6, the springs 13, 13' will reassert themselves and rotate the lever 10, 10' and its connected shaft 11 clockwise (Fig. 2) and therefore re-apply the spreading action between side gears 7, 7' and lock the differential. Therefore, torque may be applied to that road wheel which is on a firm adhesive surface, thus permitting the vehicle to be moved by the engine.

It will be noted that when the differential locking mechanism is effective, a certain amount of torque will be transmitted directly from the differential housing end walls 3, 3' to the side gears 7, 7', in view of the frictional connection between them. The amount of torque thus transmitted may be varied according to circumstances but it is contemplated that in passenger vehicles it may comprise one-third and in land vehicles possibly three-fourths of the torque transmitted. However, since a certain amount of relative slip will necessarily occur, even when the locking device is effective, the side gears 7, 7' together with the equalizing gear carrying spider 6 will gradually drop behind the differential housing, whereby the releasing of the locking is gradually effected through rotation of the levers 10, 10' in a direction opposite to that of arrow R.

Since any machine element may be utilized as transmitting members for all of the movements described and since furthermore a construction is contemplated in which the locking occurs through increase of the friction in the equalizing gears or in friction elements associated with various gears of the differential mechanism, a large number of embodiments of the invention are available. This is further increased thereby that for example a construction may be devised in which separate transmission members are provided for each side of the differential, in which case the springs which cause locking are located between the members for transmitting movement to both sides and thereby oppose the relative rotation of the differential housing with respect to the carrying spider of the equalizing gears so long as the transmitting members do not work to automatically cause locking. In this connection a construction is also contemplated in which the springs are located between the differential housing and the carrying spider for the equalizing gears.

It will be noted that the construction shown and described will serve admirably to accomplish the objects stated above. It is to be understood, however, that the constructions disclosed above are intended merely as illustrative of the invention and not as limiting as various modifications therein may be made without departing from the invention as defined by a proper interpretation of the claims which follow.

I claim:

1. In a differential mechanism for power vehicles or the like, the combination of a power applying member, two power delivery members concentric therewith, differentiating mechanism for delivering power from said power applying member to said power delivery members mounted for movement relative to the power applying member, coupling means for coupling at least one of said power delivery members to said power applying member, means for making said coupling means normally effective, and means actuated by the application of torque as between the power applying member and the differentiating mechanism serving to disengage said coupling as an incident to relative movement between the power applying member and the differentiating mechanism.

2. In a differential mechanism for power vehicles or the like, the combination of a power applying member, two power delivery members concentric therewith, differentiating mechanism for delivering power from said power applying member to said power delivery members mounted for movement relative to the power applying member, coupling means for coupling both of said power delivery members to said power applying member, means for making said coupling means normally effective, and means actuated by the application of torque as between the power applying member and at least one of the power delivery members serving to disengage said coupling as an incident to relative movement between the power applying member and the differentiating mechanism.

3. In a differential mechanism for power vehicles or the like, the combination of a power applying member, two power delivery members concentric therewith, differentiating means for delivering power from said power applying member to said power delivery members, a support for said differentiating means mounted for limited rotary movement relative to said power applying member, coupling means for coupling at least one of said power delivery members to said power applying member, means for making said coupling means normally effective, and means actuated by the application of torque as between the power applying member and the support for said differentiating means serving to disengage said coupling.

4. In a differential mechanism for power vehicles or the like, the combination of a power applying member, two power delivery members concentric therewith, differentiating mechanism for delivering power from said power applying member to said power delivery members mounted for movement relative to the power applying member, coupling means for coupling at least one of said power delivery members to said power applying member, spring means for normally holding said coupling means effective, and means actuated by the application of torque as between the power applying member and the differentiating mechanism serving to overcome the reaction of said spring means and to disengage said coupling as an incident to relative movement between the power applying member and the differentiating mechanism.

5. In a differential mechanism for power vehicles or the like, the combination of a power applying member, two power delivery members concentric therewith, differentiating mechanism for delivering power from said power applying member to said power delivery members mounted for movement relative to the power applying member, coupling means for coupling both of said power delivery members to said power applying member, a single spring means for normally holding both of said coupling means effective, and means actuated by the application of torque as between the power applying member and at least one of the power delivery members serving to overcome the reaction of said spring means and to disengage both of said coupling means as an incident to relative movement between the power applying member and the differentiating mechanism.

6. In a differential mechanism for power vehicles or the like, the combination of a power applying member, two power delivery members concentric therewith, differentiating means for delivering power from said power applying member to said power delivery members, a support for said differentiating means mounted for limited rotary movement relative to said power applying member, coupling means for coupling at least one of said power delivery members to said power applying member, spring means for making said coupling means normally effective, and means actuated by relative movement between the power applying member and the support for said differentiating means serving to overcome the reaction of said spring means and to disengage said coupling.

7. In a differential mechanism for power vehicles or the like, the combination of a power applying member, two power delivery gears concentric therewith, planetary differentiating gears meshing with for delivering power from said power applying member to said power delivery gears mounted for movement relative to the power applying member, friction clutch means for coupling at least one of said power delivery gears to said power applying member, spring means for normally holding said clutch means effective, and means actuated by the application of torque as between the power applying member and the differentiating gears serving to overcome the reaction of said spring means and to disengage said friction clutch as an incident to relative movement between the power applying member and the differentiating gears.

8. In a differential mechanism for power vehicles or the like, the combination of a power applying member, two power delivery gears concentric therewith, differentiating gears meshing with for delivering power from said power applying member to said power delivery gears mounted for movement relative to the power applying member, friction clutches for coupling each of said power delivery members to said power applying gears, a single spring means for normally holding both of said clutches effective, and means actuated by the application of torque as between the power applying member and at least one of the power delivery gears serving to overcome the reaction of said spring means and to disengage both of said clutches as an incident to relative movement between the power applying member and the differentiating gears.

9. In a differential mechanism for power vehicles or the like, the combination of a power applying member, two power delivery gears concentric therewith, differentiating gears for meshing with for delivering power from said power applying member to said power delivery gears, a support for said differentiating gears mounted for limited rotary movement relative to said power applying member, coupling means for coupling at least one of said power delivery gears to said power applying member, spring means for making said coupling means normally effective, and means actuated by relative movement between the power applying member and the support for said differentiating gears serving to overcome the reaction of said spring means and to disengage said coupling.

10. In a differential mechanism for power vehicles or the like, the combination of a power applying member, two power delivery gears concentric therewith, differentiating gears meshing with for delivering power from said power applying member to said power delivery gears, a support for said differentiating gears including a hollow journal for each of said differentiating gears mounted for limited rotary movement relative to said power applying member, coupling means for coupling at least one of said power delivery gears to said power applying member comprising a shaft located in said hollow journal, spring means connected to the outer end of said shaft, means on the inner end of said shaft for actuating said coupling means, and means actuated by the application of torque as between the power applying member and the support for said differentiating gears serving to rotate said shaft to disengage said coupling.

11. In a differential mechanism for power vehicles or the like, the combination of a power applying member, two power delivery gears concentric therewith, differentiating gears for meshing with for delivering power from said power applying member to said power delivery gears, a support for said differentiating gears mounted for limited rotary movement relative to said power applying member, coupling means for coupling at least one of said power delivery gears to said power applying member, spring means for making said coupling means normally effective and for transmitting a portion of the driving torque from said power applying means to said support, and means actuated by relative movement between the power applying member and the support for said differentiating gears resulting from the application of torque serving to disengage said coupling.

12. In a differential mechanism for power vehicles or the like, the combination of a power applying member, two power delivery gears concentric therewith, differentiating gears meshing with for delivering power from said power applying member to said power delivery gears, a support for said differentiating gears including a hollow journal for each of said differentiating gears mounted for limited rotary movement relative to said power applying member, coupling means for coupling at least one of said power delivery gears to said power applying member comprising a shaft located in said hollow journal, spring means connected to the said support and to said power applying means, means on the inner end of said shaft for actuating said coupling means by pressing said power delivery gears against a part connected with said power applying means, and means actuated by the application of torque as between the power applying member and the support for said differentiating gears serving to rotate said shaft to disengage said coupling.

ERNST FITZNER.